Patented Mar. 15, 1949

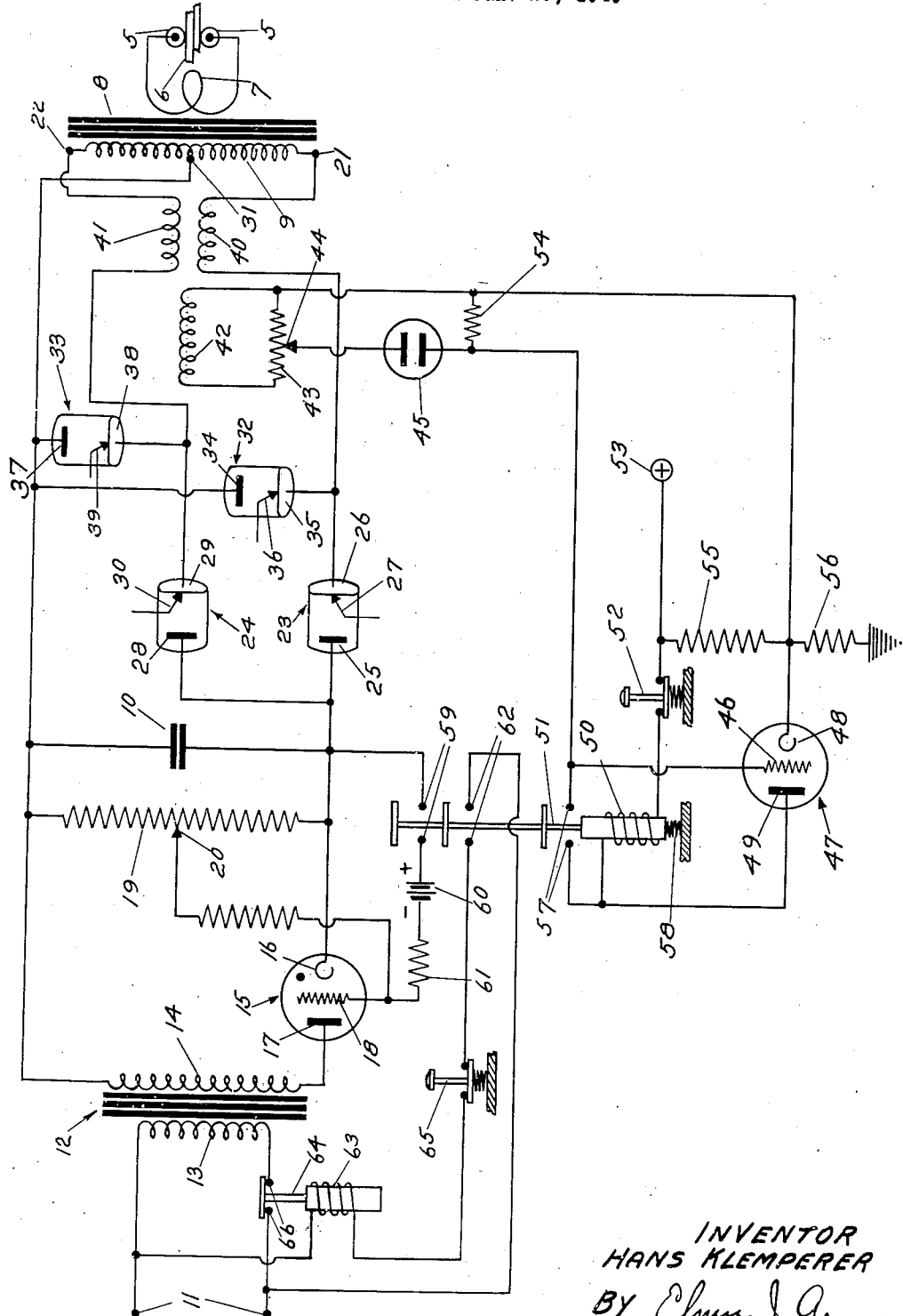

2,464,239

UNITED STATES PATENT OFFICE 2,464,239

ELECTRICAL SYSTEM

Hans Klemperer, Belmont, Mass., assignor to Raytheon Manufacturing Company, Newton, Mass., a corporation of Delaware Application January 25, 1946, Serial No. 643,421

3 Claims. (Cl. 219—4)

This invention relates to electrical systems, and more particularly to a protective device for electrical welding systems of the kind in which intermittent pulses of current are supplied to a load circuit.

In certain condenser welding systems, a protective device is required which interrupts operation and disconnects the line power as soon as a short-circuit occurs in the discharge circuit. For example, in systems of the type disclosed in United States Patent, No. 2,383,473, to John W. Dawson and the applicant, dated August 28, 1945, pulses of current are fed alternately in opposite directions through a welding transformer to effect a plurality of welding operations in rapid succession as a pair of welding electrodes roll along the work. Each welding operation welds a spot on the work, and the spots may overlap to form a continuous seam. In order to prevent undesirable surges of current, an air-core reactor is arranged in a manner to introduce a high impedance in the system in the event that two successive welding impulses overlap.

In such systems a short-circuit may pass unnoticed because the air-core reactor functions as a load, and the result is a missed spot.

It is among the objects of the present invention to provide for the prompt detection of short-circuits in such systems, and to prevent the further supply of energy to the system until the short-circuit has been corrected.

The above and other objects and features of the invention will be made fully apparent to those skilled in the art from a consideration of the following detailed description taken in conjunction with the accompanying drawing, in which the single figure shows a circuit diagram illustrating the application of the invention to a resistance welding system in which a condenser is discharged in opposite directions through the welding transformer.

Referring to the drawing, 5 indicates a pair of rotatable welding electrodes adapted to roll on work 6. Current is to be supplied to the welding electrodes in successive pulses to effect successive welding operations for predetermined angular positions of the welding electrodes. To this end the welding electrodes 5 are connected to the opposite ends of a secondary loop 7 of a transformer 8 having a primary winding 9. The primary winding 9 of the transformer 8 is adapted to be energized by the discharge of the storage condenser 10. The condenser is adapted to be charged from a power supply line 11 through a transformer 12 having a primary winding 13 connected to the power supply line and a secondary winding 14 connected across the condenser 10 through a rectifier tube 15. The rectifier tube 15 may be of the gaseous discharge type, such as a thyratron, having a cathode 16, connected to the positive side of the condenser 10, and an anode 17, connected to one end of primary winding 14, the opposite end of which is connected to the negative side of condenser 10. The tube 15 is also provided with a control grid 18.

In order to control the potential to which the condenser 10 may be charged, a potentiometer 19 connected across the condenser 10 is provided with an adjustable arm 20 connected to the control grid 18 to supply a blocking potential to said grid when the charge upon the condenser 10 rises to a predetermined value.

The positive side of condenser 10 is adapted to be connected to the outer ends 21 and 22 of the primary winding 9 of the welding transformer 8 through a pair of controlled ignition discharge tubes 23 and 24. These tubes are preferably of the mercury pool type cathode with an ignitor for initiating an arc spot on the pool in order to initiate the flow of current therethrough.

The tube 23 is provided with an anode 25 connected to the positive side of the condenser 10, a cathode 26 connected to the end 21 of the primary winding 9 and an ignitor 27. The tube 24 is also provided with an anode 28 likewise connected to the positive side of the condenser 10 and a cathode 29 which is connected to the end 22 of the primary winding 9, and an ignitor 30. The ignitors 27 and 30 may be of either the resistance immersion or of the electrostatic type and may be supplied with controlled impulses from any suitable ignition circuit timed to initiate an arc spot alternately upon the cathodes 26 and 29 as the wheels 5 move upon the work. A center tap 31 on the primary winding 9 of the transformer 8 is connected directly to the negative side of the condenser 10, completing the discharge circuit of this condenser. Alternate discharges of the condenser 10 are thus in opposite directions through the primary winding 9 of the transformer 8, the discharge being upwardly through the lower half of the primary winding 9 when the tube 23 is conductive and downwardly through the upper half of the primary winding upon the next succeeding discharge of condenser 10 when the tube 24 is conductive. A pair of controlled ignition discharge tubes 32 and 33, preferably of the same type as tubes 23 and 24, control shunt circuits across each half of the primary winding 9 to permit the energy stored in the load circuit to decay substantially exponentially upon the discharge of the condenser 10 through either half of said winding. To this end the tube 32 has its anode 34 connected to the line between the negative side of condenser 10 and the center tap 31 and its cathode 35 connected to the line between tube 23 and the end 21 of the winding 9. The ignitor 36 of the tube 32 may be energized in any suitable manner to initiate conduction through the tube upon the appearance of decay energy through the lower half of the winding 9. Similarly the tube 33 has its anode 37 connected to the center tap 31 and its cathode 38 connected to the end terminal 22 of winding 9, and is provided with an ignitor 39 which may be energized in a known manner upon the appearance of decay energy through the upper half of the primary winding 9.

The alternate discharges of the condenser 10 in opposite directions through the primary winding 9 of the transformer 8 are intended to occur in rapid succession. Portions of such successive impulses may overlap, in which case if the tubes 23 and 24 were connected directly to the primary winding 8 the effective impedances of the welding load would be substantially reduced or completely bypassed so a surge of current of undesirable magnitude would occur. In order to prevent such undesirable surges of current, it is known, as disclosed in the United States patent, No. 2,383,473, aforementioned, to interpose reactors 40 and 41 preferably of the air-core type between the tube 23 and the terminal 21 of the secondary winding 9 and between the tube 24 and the terminal 22 of said primary winding, respectively. The inductances 40 and 41 are so inductively coupled that when current varies in one of said inductances, it introduces a counter-E. M. F. in the other inductance to thereby oppose similar current variations in said latter inductance. The mutual inductance of the two coils 40 and 41 provides a sufficiently increased impedance while the current is simultaneously varied in each of said inductances to substantially reduce surges of current in the discharge system of the condenser 10 due to any overlapping of the successive relative impulses. In such a system, however, short-circuits may pass unnoticed because the reactor acts as a load, and the failure to note the short-circuit may result in a missed spot.

The present invention provides a means to prevent a further supply of energy to the system upon the occurrence of a short circuit. To this end an inductor 42, which may be provided as a tertiary winding on the air-core reactor formed by coils 40 and 41, is arranged in inductive relation to both said coils. A potentiometer 43 connected across winding or coil 42 has an adjustable arm 44 connected to a glow lamp 45. The coil 42 is of such dimensions that in case of a short-circuit discharge the glow lamp 45 is flashed by the induced voltage in said coil while voltages induced from ordinary welding discharges do not reach that limit. The opposite side of the glow lamp 45 is connected to the grid 46 of a power amplifier tube 47 such as a 6V6. The tube 47 has its cathode connected to the right-hand end of coil 42 and its anode connected through a solenoid 50 of a relay 51 and through a push button 52 to a source of positive potential 53. Currents induced in the coil 42 are in such direction as to make the left-hand end thereof positive and when the induced voltage is sufficiently high to flash the tube 45 the grid 46 of the tube 47 will be driven positive to unblock said tube and permit the flow of current from the source 53 to energize the solenoid 50 of the relay 51. A resistor 54 is provided in the grid-cathode circuit of the tube 47 and a resistor 55 is provided between the source 53 and the cathode 48. Preferably the cathode 48 is connected to ground through a resistor 56. The relay 51 is normally biased into open position by a spring 58 and upon the energization of the solenoid 50 is adapted to close a pair of contacts 57. The closure of contacts 57 completes a holding circuit applying a positive bias to the grid 46 from the source 53 and thus maintains an energizing current to the solenoid 50 after the momentary currents induced in the coil 42 due to a short-circuit discharge have disappeared. A second pair of contacts 59 adapted to be closed upon the energization of the relay 51 complete a circuit for applying negative bias from a battery 60 to the grid 18 of the rectifier tube 15 through a resistor 61. The rectifier tube 15 is thus blocked upon the appearance of the next succeeding half-wave of current applied thereto in a positive direction from the transformer 12. A third pair of contacts 62 adapted to be closed upon the energization of the relay 51 complete a shunt circuit across line 11 through the solenoid 63 of a relay 64. The shunt circuit includes a normally closed push button switch 65. The relay 64 normally closes a pair of contacts 66 in the power supply line 11. Upon the energization of this relay the contacts 66 are opened to block further supply of energy to the system from the line 11.

Upon the actuation of the relays 51 and 64 further energy will not be supplied to the system. The operator can then correct the conditions causing the high current flow after which the push button switches 52 and 65 may be actuated to return the system to its normal operating condition.

While specific details of a preferred embodiment of this invention have been described in the foregoing it will, of course, be understood that the invention is not limited to these details. Various modifications may be made by those skilled in the art from a consideration of the embodiment shown and the teachings hereof. For example it will be apparent that full wave rectification may be used in charging the condenser 10, instead of the half wave rectification shown. The inductor 42 may be variously arranged with respect to the other elements of the circuit as long as the induced potential from ordinary welding discharges is below a predetermined value while voltages induced from excessive current flow in the system are above this value.

What is claimed is:

1. In an electrical welding system, a welding load circuit, means for delivering pulses of current in opposite directions to the load circuit, an inductance for impeding overlapping portions of opposing pulses of current delivered to said load circuit, and circuit means inductively coupled to said inductance for blocking the supply of energy to said welding load circuit when the current through said inductance exceeds a predetermined value.

2. In an electrical system, a load circuit, means for delivering a pulse of current to said load circuit, a second means for delivering another pulse of current to the load circuit, an inductance for impeding pulses of current delivered to said load circuit, said inductance having a low impedance to non-coincident portions of said pulses of current and having a substantially higher impedance to coinciding portions of said pulses of current, and circuit means inductively coupled to said inductance for blocking the supply of energy to said load circuit when the current through said inductance exceeds a predetermined value.

3. A condenser welding system comprising a storage condenser, a source of supply for charging said condenser, a welding load circuit including a welding transformer divided into two sections, means for alterntely discharging said condenser in opposite directions through said sections of said transformer, a pair of inductors, one associated with each of said sections, means inductively coupled to each of said inductors for deriving a control impulse from said load circuit when the current therethrough exceeds the normal welding impulses, and means responsive to said control impulse for blocking the supply of charging current to said condenser.

HANS KLEMPERER.

REFERENCES CITED

The following references are of record in the file of this patent:

UNITED STATES PATENTS

| Number | Name | Date |
|---|---|---|
| 1,314,515 | Gravell | Sept. 2, 1919 |
| 1,684,108 | Phelps | Sept. 11, 1928 |
| 2,024,019 | Wright | Dec. 10, 1935 |